United States Patent
Stoschek et al.

(10) Patent No.: US 7,382,237 B2
(45) Date of Patent: Jun. 3, 2008

(54) DISPLAY ARRANGEMENT FOR A VEHICLE

(75) Inventors: Arne Stoschek, Palo Alto, CA (US); Cedric Dupont, San Francisco, CA (US); Pao Chen, Milpitas, CA (US); Derek Pai, San Francisco, CA (US); Sven Strohband, Mountain View, CA (US)

(73) Assignee: Volkswagen AG, Wolfsburg (DE)

( * ) Notice: Subject to any disclaimer, the term of this patent is extended or adjusted under 35 U.S.C. 154(b) by 218 days.

(21) Appl. No.: 11/323,587

(22) Filed: Dec. 30, 2005

(65) Prior Publication Data
US 2006/0158740 A1    Jul. 20, 2006

Related U.S. Application Data

(60) Provisional application No. 60/640,832, filed on Dec. 30, 2004.

(51) Int. Cl.
| | |
|---|---|
| B60Q 1/00 | (2006.01) |
| G08B 25/00 | (2006.01) |
| G09G 5/00 | (2006.01) |
| G01C 21/00 | (2006.01) |

(52) U.S. Cl. .................. 340/438; 340/425.5; 340/461; 340/525; 340/815.73; 340/815.78; 340/980; 362/23; 345/7

(58) Field of Classification Search ................. 340/438
See application file for complete search history.

(56) References Cited

U.S. PATENT DOCUMENTS

| | | | |
|---|---|---|---|
| 5,920,256 A | * | 7/1999 | Toffolo et al. .............. 340/461 |
| 6,433,701 B1 | | 8/2002 | Simon et al. ............ 340/815.4 |
| 6,597,412 B1 | | 7/2003 | Buzak et al. ................. 349/32 |
| 6,621,471 B1 | * | 9/2003 | Ozaki et al. .................... 345/4 |
| 6,674,419 B2 | | 1/2004 | Ilcisin et al. .................. 345/66 |
| 6,741,223 B2 | | 5/2004 | Kobayashi et al. ............ 345/7 |

FOREIGN PATENT DOCUMENTS

| | | |
|---|---|---|
| DE | 4323082 A1 | 1/1995 |
| DE | 4334855 A1 | 4/1995 |
| DE | 4407855 A1 | 8/1995 |
| DE | 19819821 | 9/1999 |
| DE | 19819393 | 11/1999 |

(Continued)

OTHER PUBLICATIONS

Texas Instruments' "Who Says You Can't Be Cutting-Edge and Tried and True?", at internet site <www.dip.com/dip_technology/dip_technology_overview.asp>, 3 pages, 2006.

(Continued)

Primary Examiner—Donnie L Crosland
(74) Attorney, Agent, or Firm—Baker Botts L.L.P.

(57) ABSTRACT

A display arrangement for a vehicle has, in particular, a multipurpose instrument or is configured as a multipurpose instrument. The display arrangement includes a first display device to display information concerning operation of the vehicle, a glass with adjustable transparency arranged in front of the first display device, with reference to the viewing direction of the display arrangement, and a second display device to display information concerning operation of the vehicle or additional information concerning operation of the vehicle.

16 Claims, 4 Drawing Sheets

FOREIGN PATENT DOCUMENTS

| | | |
|---|---|---|
| DE | 19819822 | 11/1999 |
| DE | 19941351 | 3/2001 |
| DE | 19943571 | 3/2001 |
| DE | 10225385 A1 | 1/2003 |
| DE | 10154227 A1 | 5/2003 |
| DE | 10214789 A1 | 10/2003 |
| DE | 20210601 U1 | 11/2003 |
| EP | 0272877 | 12/1987 |
| EP | 1052133 A2 | 11/2000 |
| EP | 1342605 A1 | 9/2003 |
| JP | 02282784 A | 11/1990 |

OTHER PUBLICATIONS

Brillian Corporations's, "Delivering High-Information-Content Projection Microdisplays", at internet site <www.brilliancorp.com/products/projection.html>, 2 pages, 2005.

* cited by examiner

DISPLAY ARRANGEMENT FOR A VEHICLE

CROSS-REFERENCE TO RELATED APPLICATIONS

This application claims the benefit of U.S. Provisional Application No. 60/640,832 filed on Dec. 30, 2004, entitled "ANZEIGEANORDNUNG FÜR EIN KRAFTFAHRZEUG", which is incorporated herein by reference in its entirety.

TECHNICAL FIELD

The invention concerns a display arrangement for a vehicle, especially comprising a multipurpose instrument or configured as a multipurpose instrument.

BACKGROUND

A multipurpose instrument with a rigid circuit board arranged on the back of a base element is known from DE 199 43 571 A1. This base element is partly covered on the front by a support element, which is hinged to the base element. A flexible circuit board extends over the front of the base element and support element, enclosing a defined angle to an edge region of a connection area hinged to the rigid circuit board, which is connected to this circuit board, for example, by press soldering.

A multipurpose instrument is known from DE 199 41 351 A1, with a base element divided into display fields, which are aligned at different angles to each other. On the front of the base element, an additional circuit board, extending over several display fields, is arranged. This consists of rigid circuit board parts, which have flexible connection areas with the conductor paths in the transitional region of the display fields.

An integrated multipurpose instrument for display of different measurement data in a vehicle is known from DE 198 19 822 A1, which is equipped with analog and digital display instruments. The integrated multipurpose instrument includes a device to drive the display instruments and to execute one ore more additional functions of the vehicle central electronic system and vehicle power electronics and at least one integrated security device for the device.

A multipurpose instrument for display of different measurement data in a vehicle is known from DE 198 19 821 C1, which is equipped with analog and digital display instruments, in which mechanical, optical and electrical components of the display instruments are mounted on a circuit support device, and the electronic control of the display instruments occurs via an electronics module that can be mounted on the circuit support device. The circuit support device has a wiring film, which can be stretched between a rear cover and a front cover.

A multipurpose instrument for display of different measurement data in a vehicle is also known from DE 198 19 393 A1, which is equipped with analog and digital display instruments, in which mechanical, optical and electrical components of the display instruments are secured on a support plate, and electronic control of the display instruments occurs from an electronics module that can be mounted on a support plate. However, a circuit support device to support the wiring of the electrical components is mounted on the support plate.

Another display device for a vehicle is known, for example, from EP 0 272 877 A2.

SUMMARY

The task of the invention is to improve a display device or display arrangement for a vehicle that comprises a multipurpose instrument.

The aforementioned task can be solved by a display arrangement for a vehicle, comprising a multipurpose instrument or configured as a multipurpose instrument, in which the display arrangement includes a first display device to display information concerning operation of the vehicle, a glass arranged in front of the first display device, with reference to a viewing direction of the display device, with adjustable transparency, and a second display device to display the information concerning operation of the vehicle and/or other information concerning operation of the vehicle, especially on the glass with adjustable transparency.

Information concerning operation of the vehicle according to the invention can be the speed of the vehicle, the speed of an engine of the vehicle, the temperature of an engine of the vehicle, tank filling, outputs of a navigation system, outputs of a telephone, outputs of a music system, outputs of an infotainment system, outputs of an air conditioner, a picture of the surroundings and/or interior of the vehicle or additional information described in the practical example.

A glass with adjustable transparency according to the invention is especially a glass that can assume a state, depending on the applied voltage, especially by orthogonal polarization of light, in which it is transparent, and can assume a state, in which it is opaque. A glass with adjustable transparency according to the invention is especially a glass that can assume a state, in which it is transparent, and can assume a state, in which it is opaque, in which it can be switched between these two states in less than 0.1 s.

In one embodiment of the invention, the information concerning operation of the vehicle and/or the additional information concerning operation of the vehicle can be displayed by means of the second display device on the glass with adjustable transparency.

In another embodiment of the invention, the information concerning operation of the vehicle and/or the additional information concerning operation of the vehicle can be projected, by means of the second display device, onto the glass with adjustable transparency, especially onto the side of the glass with adjustable transparency facing away from the viewing direction. The second display device is then configured, in particular, as a projection device or projector. Appropriate projectors include digital light processing (DLP) projectors, as disclosed under the Internet address www.dlp.com/dip_technology/dip_technology_overview.asp, or liquid crystal on silicon (LCOS) projectors, as disclosed under the Internet address www.intel.com/design/celect/technology/lcos/#microdisplay and www.brilliancorp.com/products/projection.html.

In another embodiment of the invention, the display device is a display control for adjusted control of the glass with adjustable transparency, allocated to the second display device. It is then prescribed, in particular, that, by means of the second display device, information is only projected onto the glass with adjustable transparency when it is opaque.

In another embodiment of the invention, the glass with adjustable transparency covers at least most of the first display device with reference to the viewing direction of the display arrangement.

In another embodiment of the invention, the glass with adjustable transparency covers the first display device with reference to the viewing direction of the display device essentially completely.

In another embodiment of the invention, the glass with adjustable transparency comprises at least two segments, controllable independently of each other.

In another embodiment of the invention, the glass with adjustable transparency includes at least one CLC (cholesteric liquid crystal) layer and/or at least one PDLC (polymer dispersed liquid crystal) layer. A PDLC layer can assume a position, independently of the applied voltage, in which it is transparent, and can assume a position, in which it is opaque. Appropriate PDLC layers are disclosed in U.S. Pat. No. 6,674,419 (incorporated by reference) and U.S. Pat. No. 6,597,412 (incorporated by reference).

In another embodiment of the invention, the first display device includes an analog, especially mechanical, pointer instrument.

The aforementioned task can also be solved by a vehicle with a display arranged especially comprising one or more of the aforementioned features, in which the display arrangement includes a first display device to display information concerning operation of the vehicle, a glass with adjustable transparency arranged in front of the first display device, with reference to the viewing direction of the display arrangement, and a second display device to display information concerning operation of the vehicle and/or additional information concerning operation of the vehicle, especially on the glass with adjustable transparency.

In one embodiment of the invention, the vehicle includes a navigation system, in which information output by the navigation system can be displayed by means of the second display device, especially on the glass with adjustable transparency, a telephone, in which information output by the telephone can be displayed by means of the second display device, especially on the glass with adjustable transparency, a music system, in which the information output by the music system can be displayed by means of a second display device, especially on the glass with adjustable transparency, an air conditioner, in which information output by the air conditioner can be displayed by the second display device, especially on the glass with adjustable transparency, and/or an infotainment system, in which information output by the infotainment system can be displayed with the second display device, especially on the glass with adjustable transparency.

In another embodiment of the invention, the vehicle includes a camera, in which an image, recorded by means of the camera, can be displayed by means of the second display device, especially on the glass with adjustable transparency.

The vehicle according to the invention can be especially an individual land vehicle, usable in street traffic. Vehicles according to the invention are not particularly restricted to land vehicles with internal combustion engines.

Additional advantages and details are apparent from the following description of practical examples.

DETAILED DESCRIPTION

Figure 1:
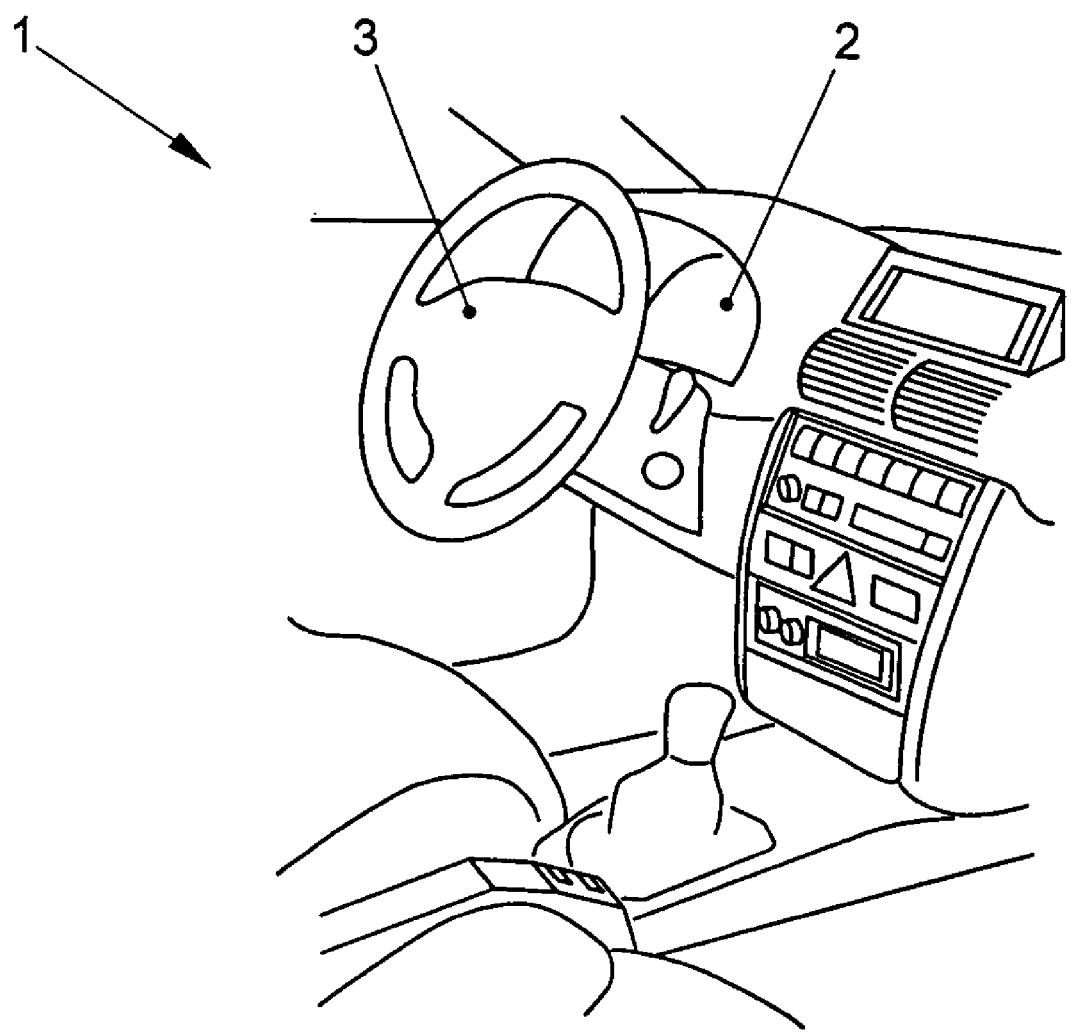
FIG. 1 shows a practical example of an internal view of the vehicle.
Figure 2:
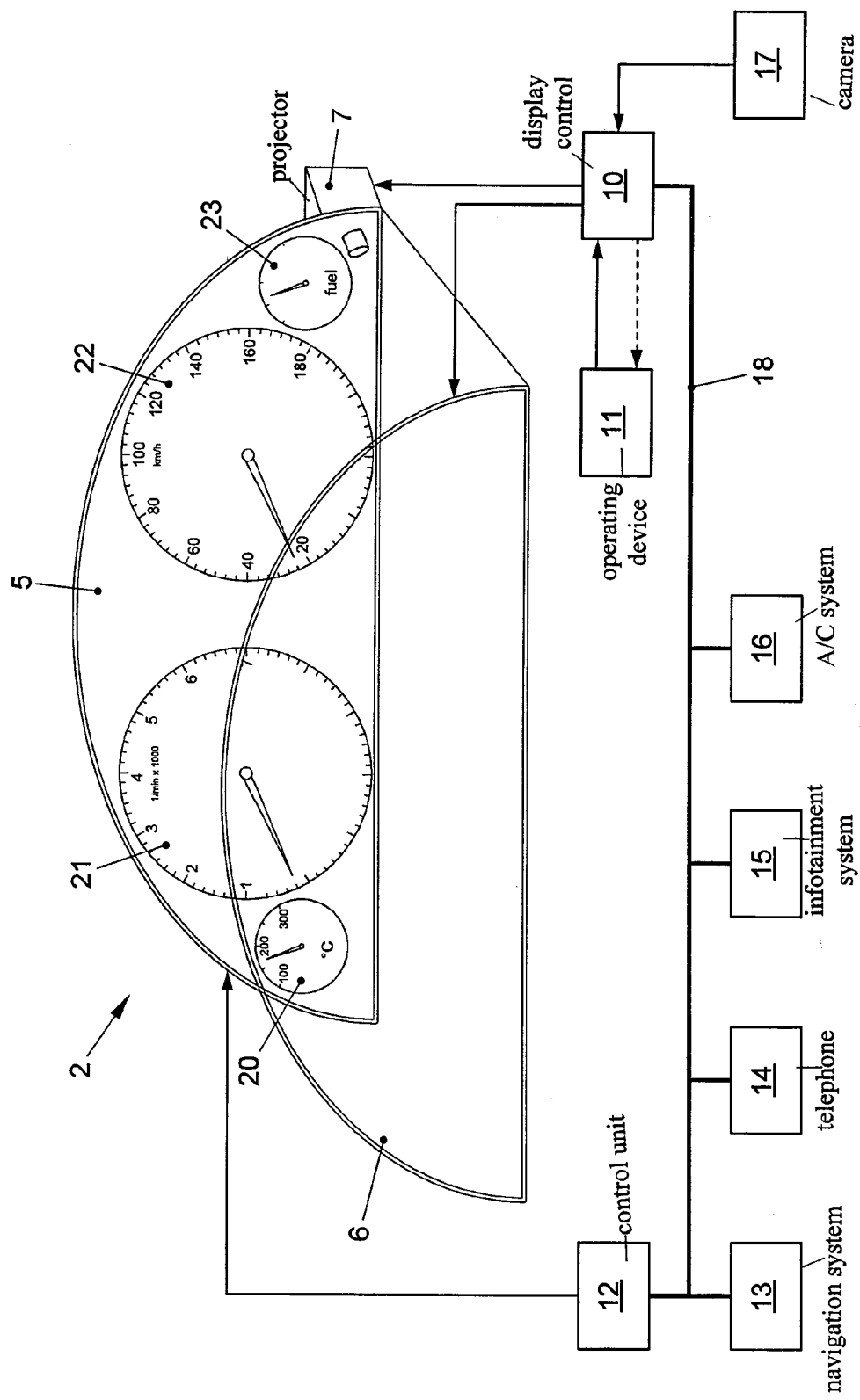
FIG. 2 shows a practical example of a display arrangement, equipped as a multipurpose instrument in a first display state.

FIG. 1 shows a practical example of an inside view of a vehicle 1. In the vehicle 1, behind steering wheel 3, a display arrangement 2, equipped as a multipurpose instrument, is arranged, depicted in FIG. 2 as a sketch viewed from the viewing direction. The display arrangement 2 includes a first display device, equipped as an instrument panel 5 with mechanical round instruments 20, 21, 22, 23 to display a coolant temperature, an engine speed, a speed or tank content of vehicle 1.

The display arrangement 2 also includes a glass 6 with adjustable transparency arranged in front of instrument panel 5, with reference to the viewing direction of display arrangement 2, at a spacing between 2 cm and 15 cm. Glass 6 includes a CLC (cholesteric liquid crystal) layer and/or a PDLC (polymer dispersed liquid crystal) layer. A PDLC layer can assume a state, in which it is transparent, and assume a state, in which it is opaque, depending on the applied voltage. Appropriate PDLC layers are disclosed in U.S. Pat. No. 6,674,419 (incorporated by reference) and U.S. Pat. No. 6,597,412 (incorporated by reference).

Display arrangement 2 also includes a second display device, equipped as a projection device or projector 7. Appropriate projectors include digital light processing (DLP) projectors or liquid crystal on silicon (LCOS) projectors.

A display control 10 to control glass 6 and projector 7, especially tuned to each other, is assigned to display arrangement 2. By means of display control 10, the display arrangement can be switched from a first display state, depicted in FIG. 2, to a second display state, depicted in FIG. 3, and/or a third display state, depicted in FIG. 4, from the second display state to the first or third display state and from the third display state to the first or second display state. Additional display states can also be provided. It can also be prescribed, that the display states or some of the display states of display arrangement 2 are changed automatically as a function of an operating state of vehicle 1 and/or as a function of an operating state of a device of vehicle 1, for example, an engine, a lock, a navigation system 13 of vehicle 1, a telephone 14 of vehicle 1 or a telephone connected in terms of data to vehicle 1, an infotainment system 15 of vehicle 1, including a music system, and/or an air conditioner 16 of vehicle a, that the display states or some of the display states of display arrangement 2 can be changed by operating a corresponding operating device 11, and/or that the display states or some of the display states of the display arrangement 2 are changed on proposal of the display control 10 and by subsequent activation of this proposal by means of the corresponding operating device 11.

Figure 3:
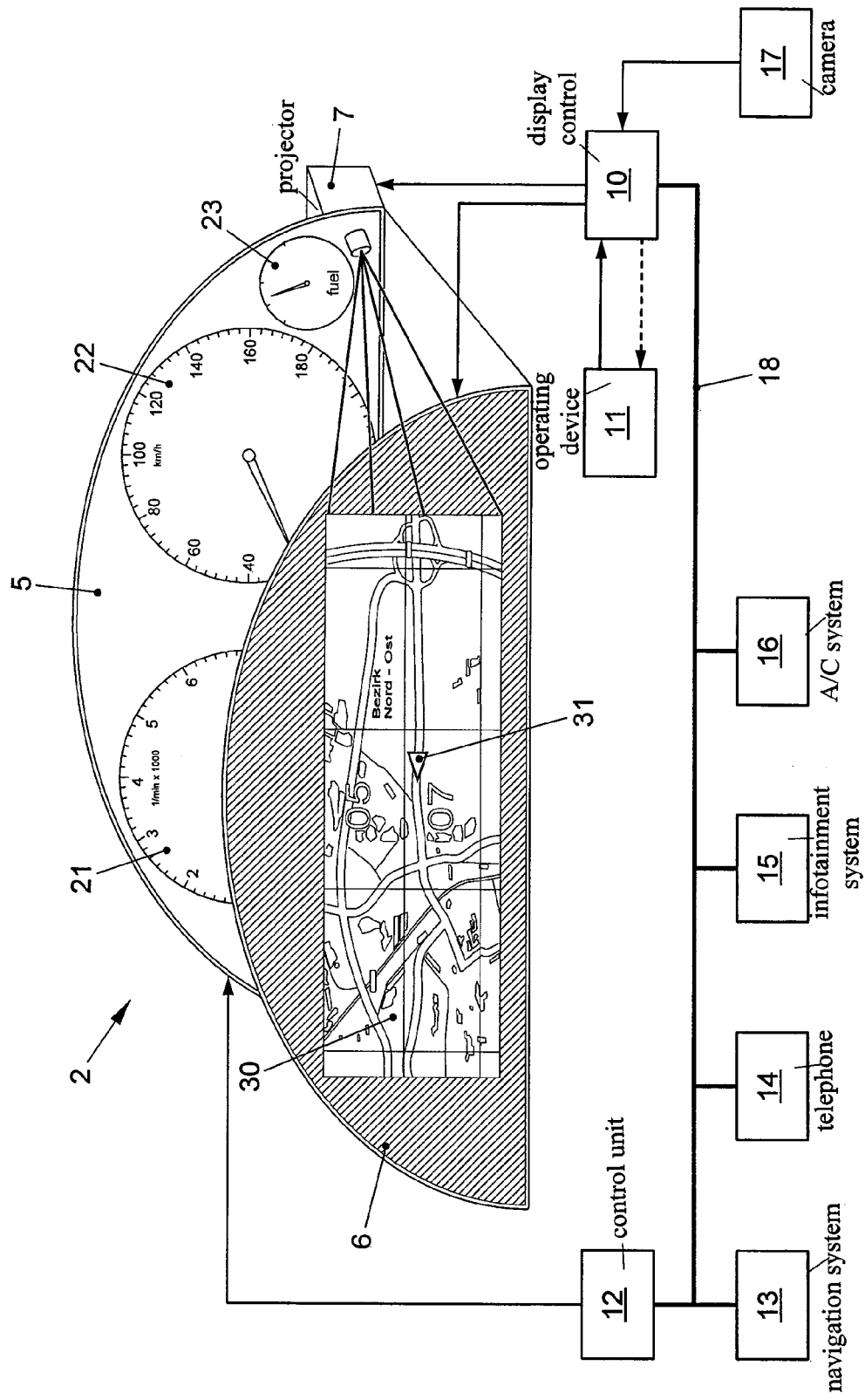
FIG. 3 shows the display arrangement according to FIG. 2, equipped as a multipurpose instrument in a second display state.
Figure 4:
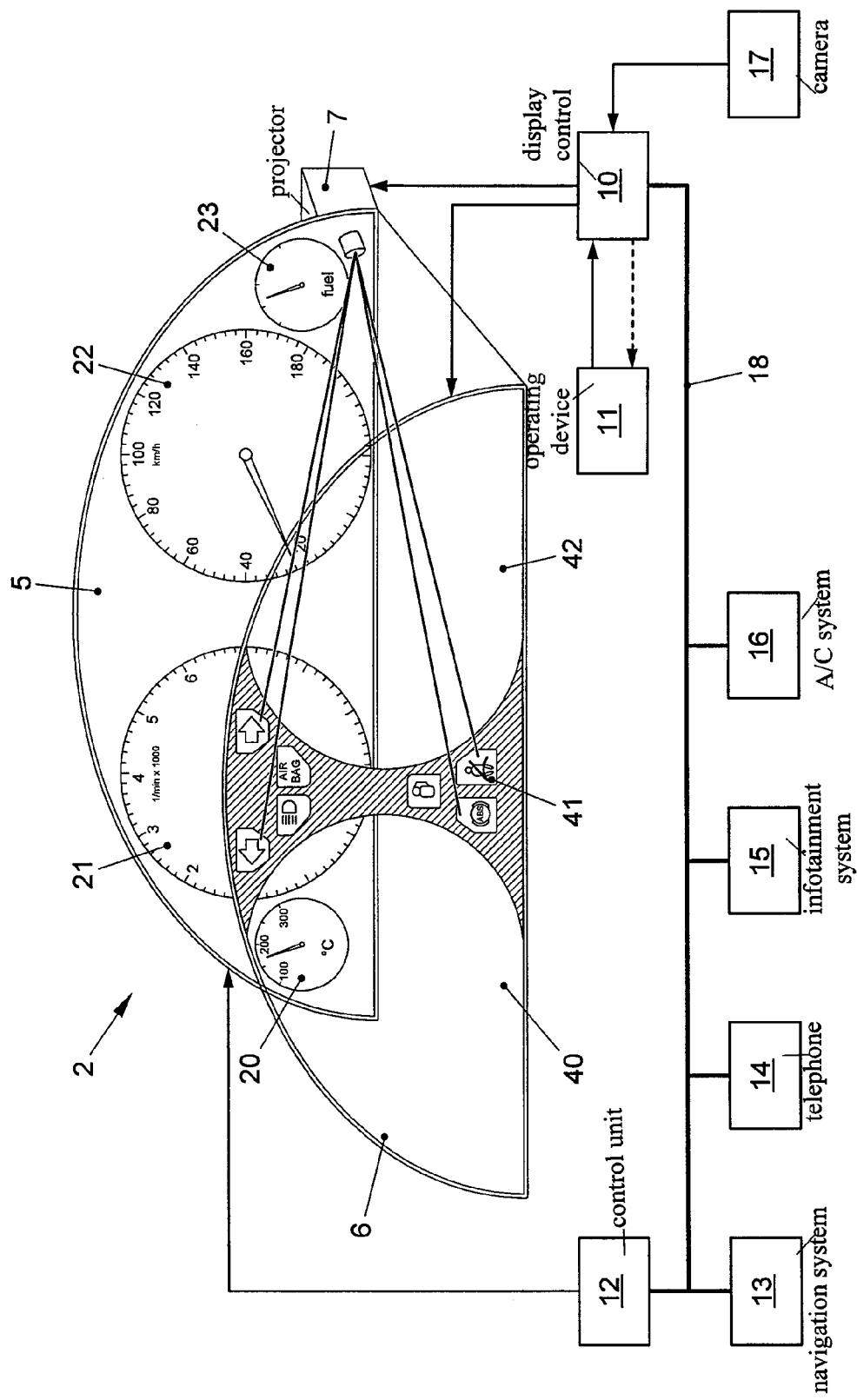
FIG. 4 shows the display arrangement according to FIG. 2, equipped as a multipurpose instrument in a third display state.

An example for automatic changing of a state of display arrangement 2, as a function of an operating state of vehicle 1 and/or as a function of an operating state of a device of vehicle 1, can be the case for automatic fade-out of the map section 30, depicted in FIG. 3 for the case, in which the vehicle 1 is situated on the street that has no intersection for a specific path.

The vehicle 1 also includes a control 12 for control of the instrument panel 5. The control 12, the navigation system 13, the telephone 14, the infotainment system 15 and the air conditioner 16 are connected to the display control 10 via a bus system 18. In addition, the display control 10 is connected, in terms of data, to a camera arrangement 17. The camera arrangement 17 can be a rear camera, a front camera, a corner peeking camera, an internal camera or a backseat camera and/or an infrared camera, for example, aligned frontward.

By means of projector 7, output information of a navigation system 13 (for example, travel direction indications, point of interest information or, as shown in FIG. 3 for the second display state, the position 31 of vehicle 1 on a map section 30), output information of telephone 4, output information of infotainment system 15 (like music information, videos, emails or Internet applications) and/or output information of air conditioner 16 can be displayed on the glass 6 in the opaque state. By means of projector 7, for example, the coolant temperature, the engine speed, the speed or tank content can be displayed on glass 6 in the opaque state. By means of projector 7, for example, park-distance control information, information of a driver assistance system, for example, obstacles or free parking spaces, or comfort information, for example, seat adjustment or window operation, can be displayed on the glass 6 in the opaque state.

By means of projector 7, pictures can be displayed on the glass in the opaque state, which convert the round instruments 20, 21, 22 or 23, enclose the round instruments 20, 21, 22 or 23, or point to a round instrument 20, 21, 22 or 23. For example, an arrow can point to the coolant temperature. It can also be prescribed to display additional information in the vicinity, which explains an actual state and/or proposes measures or operations. For example, pictures can be displayed that replace the round instruments 20, 21, 22 or 23, simulate them or expand them. For example, with the change into a state, in which glass 6 is opaque, by means of projector 7, a tachometer corresponding to the round instrument 22 is projected onto the glass and therefore altered in its size and/or position, in order to create room for display of a map. By means of projector 7, in conjunction with glass 6 in the opaque state, a brief or blinking optical stimulus can be generated, in order to divert attention to one or more of the round instruments 20, 21, 22 or 23. This can occur so quickly, that it is only detected as a movement, without visible covering of the round instruments 20, 21, 22 or 23 occurring.

By means of project 7, logos, marks and/or safety information can be displayed on glass 6 in the opaque state.

In one embodiment of the invention, the glass 6, with adjustable transparency, includes two independently controllable segments. This is shown as an example in FIG. 4, in which three segments 40, 41 and 42 are provided as an example. Individual segments can be arranged next to each other, overlapping or in different planes.

It can be prescribed, by segmenting of glass 6, to partially cover the round instrument 22 corresponding to a tachometer, in order to prompt a speed limitation. By segmenting glass 6, it can also be proposed to cover a speedometer corresponding to round instrument 22, if a switch is made from manual to automatic shifting.

| LIST OF REFERENCE NUMBERS | |
|---|---|
| 1 | Vehicle |
| 2 | Display arrangement |
| 3 | Steering wheel |
| 5 | Instrument panel |
| 6 | Glass |
| 7 | Projector |
| 10 | Display control |
| 11 | Operating device |
| 12 | Control |
| 13 | Navigation system |
| 14 | Telephone |
| 15 | Infotainment system |
| 16 | Air conditioner |
| 17 | Camera arrangement |
| 18 | Bus system |
| 20, 21, 22, 23 | Round instrument |
| 30 | Map section |
| 31 | Position |
| 40, 41, 42 | Segment |

What is claimed is:

1. A display arrangement for a vehicle, the display arrangement comprising:
a first display device to display information concerning operation of the vehicle;
a glass with adjustable transparency arranged in front of the first display device in a viewing direction of the display device; and
a second display device to display information concerning operation of the vehicle or additional information concerning operation of the vehicle, wherein the information concerning operation of the vehicle or the additional information concerning operation of the vehicle can be displayed or projected by means of the second display device on the glass with adjustable transparency.

2. A display arrangement according to claim 1, wherein the information concerning operation of the vehicle or the additional information concerning operation of the vehicle can be projected, by means of the second display device, onto a side of the glass with adjustable transparency facing away from the viewing direction.

3. A display arrangement according to claim 1, wherein the glass with adjustable transparency covers at least an essential part of the first display device, with reference to the viewing direction of the display arrangement.

4. A display arrangement according to claim 1, wherein the glass with adjustable transparency covers the first display device, with reference to the viewing direction of the display arrangement, essentially forward.

5. A display arrangement according to claim 1, wherein the glass with adjustable transparency comprises at least two independently controllable segments.

6. A display arrangement according to claim 1, wherein the glass with adjustable transparency comprises a cholesteric liquid crystal (CLC) layer or a polymer dispersed liquid crystal layer (PDLC).

7. A display arrangement according to claim 1, wherein the first display device comprises an analog pointer instrument.

8. A display arrangement according to claim 7, wherein the pointer instrument is a mechanical pointer instrument.

9. A vehicle with a display arrangement, the display arrangement comprising:
a first display device to display information concerning operating of the vehicle;

a glass with adjustable transparency arranged in front of the first display device, with reference to the viewing direction of the display arrangement; and a second display device to display information concerning operating of the vehicle or additional information concerning operation of the vehicle, especially on the glass with adjustable transparency, wherein the information concerning operation of the vehicle or the additional information concerning operation of the vehicle can be displayed or projected by means of the second display device on the glass with adjustable transparency.

10. A vehicle according to claim 9, the vehicle further comprising:

a navigation system, in which information output by the navigation system can be displayed by means of the second display device, a telephone, in which information output by a telephone can be displayed by the second display device, a music system, in which information output by the music system can be displayed by the second display device, an air conditioner, in which information output by the air conditioner can be displayed by the second display device, or an infotainment system, in which an information output by the infotainment system can be displayed by the second display device.

11. A vehicle according to claim 9, the vehicle further comprising:

a camera, in which a picture recorded by the camera can be displayed by means of the second display device.

12. A display arrangement according to claim 9, wherein the information concerning operation of the vehicle or the additional information concerning operation of the vehicle can be projected, by means of the second display device, onto a side of the glass with adjustable transparency facing away from the viewing direction.

13. A display arrangement for a vehicle, the display arrangement comprising:

a first display device to display information concerning operation of the vehicle;

a glass with adjustable transparency comprising a cholesteric liquid crystal (CLC) layer or a polymer dispersed liquid crystal layer (PDLC) and comprising at least two independently controllable segments arranged in front of the first display device in a viewing direction of the display device covering at least an essential part of the first display device, with reference to the viewing direction of the display arrangement; and a second display device to display information concerning operation of the vehicle or additional information concerning operation of the vehicle.

14. A display arrangement according to claim 13, wherein the glass with adjustable transparency covers the first display device, with reference to the viewing direction of the display arrangement, essentially forward.

15. A display arrangement according to claim 13, wherein the first display device comprises an analog pointer instrument.

16. A display arrangement according to claim 15, wherein the pointer instrument is a mechanical pointer instrument.

* * * * *